United States Patent

Rasche et al.

Patent Number: 6,151,378
Date of Patent: Nov. 21, 2000

[54] METHOD AND DEVICE FOR PROCESSING OF MEDICAL IMAGE DATA

[75] Inventors: Volker Rasche, Hamburg; Michael Grass, Ellerbek, both of Germany; Henning Braunisch, Cambridge, Mass.

[73] Assignee: U.S. Philips Corporation, New York, N.Y.

[21] Appl. No.: 09/274,390

[22] Filed: Mar. 23, 1999

[30] Foreign Application Priority Data

Mar. 28, 1998 [DE] Germany .......................... 198 13 926

[51] Int. Cl.[7] .......................................... A61B 6/03
[52] U.S. Cl. ............................. 378/4; 378/15; 378/901
[58] Field of Search ............................. 378/4, 15, 901

[56] References Cited

U.S. PATENT DOCUMENTS

| | | | |
|---|---|---|---|
| 5,974,110 | 10/1999 | Hu | 378/19 |
| 6,072,851 | 6/2000 | Sivers | 378/15 |

*Primary Examiner*—David V. Bruce
*Attorney, Agent, or Firm*—Dwight H. Renfrew

[57] ABSTRACT

The invention relates to a method and a device for the processing of medical image data so as to determine output function data (S(k)), situated at grid points (8) of a selected grid, from input function data ($I_c(r)$) situated at grid points (2, 7) of a Cartesian grid (1, 6). A method of this kind is used, for example in magnetic resonance tomography or computer tomography, so as to calculate arbitrary projections from given function data. The method of the invention includes the following steps: determination of modified input function data ($I_c'(r)$) by division of the input function data ($I_c(r)$) by the Fourier transform (c(r)) of a convolution kernel (C(k)), determination of the Fourier transform ($S_c'(k)$) of the modified input function data ($I_c'(r)$), and determination of the output function data (S(k)) by convolution of the Fourier transform ($S_c'(k)$) of the modified input function data with the convolution kernel (C(k)), the convolution kernel (C(k)) being a weighting function for weighting the grid points (2, 7) of the Cartesian grid (1, 6) in conformity with their distance from grid points (8) of the selected grid. The method according to the invention offers essentially a substantial reduction of the calculation time required.

12 Claims, 4 Drawing Sheets

METHOD AND DEVICE FOR PROCESSING OF MEDICAL IMAGE DATA

BACKGROUND OF THE INVENTION

1. Field of the Invention

The invention relates to a method for the processing of medical image data so as to determine output function data, situated at grid points of a selected grid, from input function data situated at grid points of a Cartesian grid, as well as to a device in which the method can be carried out.

2. Description of Related Art

A method of this kind is required for many medical applications in which medical image data is processed. For example, for 2D/3D recording it is important to have an efficient method for calculating two-dimensional projections from a three-dimensional data set. Nowadays, for this purpose use is made of, for example a ray tracing algorithm in which the integral of grey values within a pre-operative 3D data set is calculated along a ray from the radiation source to an image point in the detector plane (in the case of X-ray imaging). In order to enable intra-operative use of such a method, the calculation must be performed sufficiently quickly since a plurality of projections of the pre-operative data set must be calculated at different angles and be compared with currently measured projections so as to enable a 2D/3D recording to be made. A method of the kind set forth is used not only for X-ray imaging, but also for other medical imaging techniques, for example for magnetic resonance tomography and X-ray computer tomography (CT), notably for the calculation of projections.

SUMMARY OF THE INVENTION

It is an object of the invention to provide a method for the processing of medical image data of the kind set forth which is notably faster than the known method.

This object is achieved by means of a medical image data processing method for determining output function data, situated at grid points of a selected grid, from input function data, situated at grid points of a Cartesian grid, the method includes: determination of modified input function data by division of the input function data by the Fourier transform of a convolution kernel, determination of the Fourier transform of the modified input function data, and determination of the output function data by convolution of the Fourier transform of the modified input function data with the convolution kernel, wherein the convolution kernel is a weighting function for weighting the grid points of the Cartesian grid in conformity with their distance from grid points of the selected grid.

The invention is based on the recognition of the fact that the time-consuming calculation of interpolations can be replaced by simpler calculation steps (so-called resampling). Input function data, for example 2D object function data in the space domain, present at grid points of a Cartesian grid are first divided by the Fourier transform of a convolution kernel and the Fourier transform of the modified input function data is determined. The convolution kernel is a kind of weighting function whereby the grid points of the Cartesian grid are weighted in conformity with their distance from a grid point of the selected grid. The convolution kernel is required for the subsequent convolution at the grid points of the selected grid: during this step the Fourier transform of the modified input function data is convoluted with the convolution kernel itself, yielding the output function data, for example projection data, on the selected grid, for example a polar grid in the frequency domain.

The main advantage of the invention resides in its significantly shorter calculation time: the number of calculation steps required to calculate a one-dimensional projection is proportional to n log n (n=number of sampling points) and for a two-dimensional projection it is proportional to $n^2$ log n, whereas in the case of customary methods the number of calculation steps is proportional to $n^2$ for one-dimensional projections and $n^3$ for two-dimensional projections. Moreover, the image quality can be enhanced in various applications of the method according to the invention.

The method according to the invention is preferably used for calculating projection data on a polar grid; in the grid points of the selected grid are then situated on radial lines or planes extending through the origin of the frequency domain. In order to form an image function data in the space domain can also be simply derived from the projection data by inverse Fourier transformation.

Preferred applications of the method include applications to: output function data which is projection data of a parallel beam projection, conical beam projection, or fan-shaped beam projection, especially for X-ray imaging; rotating the image of an object, the object function data of the rotated image then being determined from the output function data by Fourier transformation; deforming, deformation-eliminating, or enlarging/reducing an image or image section, the input function data then being formed from image data in the space domain by Fourier transformation; and determining interpolation data from spiral volume data during spiral computer tomography. Depending on the relevant application, an appropriate grid is selected on which the output function data should be situated.

Preferably, a Kaiser-Bessel function or a Gaussian function is used as the convolution kernel; however, the use of other kernels is also feasible.

The sequence of the steps of the method according to the invention may also be reversed, without seriously affecting the results of the method.

BRIEF DESCRIPTION OF THE DRAWING

The invention will be described in detail hereinafter with reference to the drawing. Therein.

DETAILED DESCRIPTION OF THE PREFERRED EMBODIMENT

Figure 1:
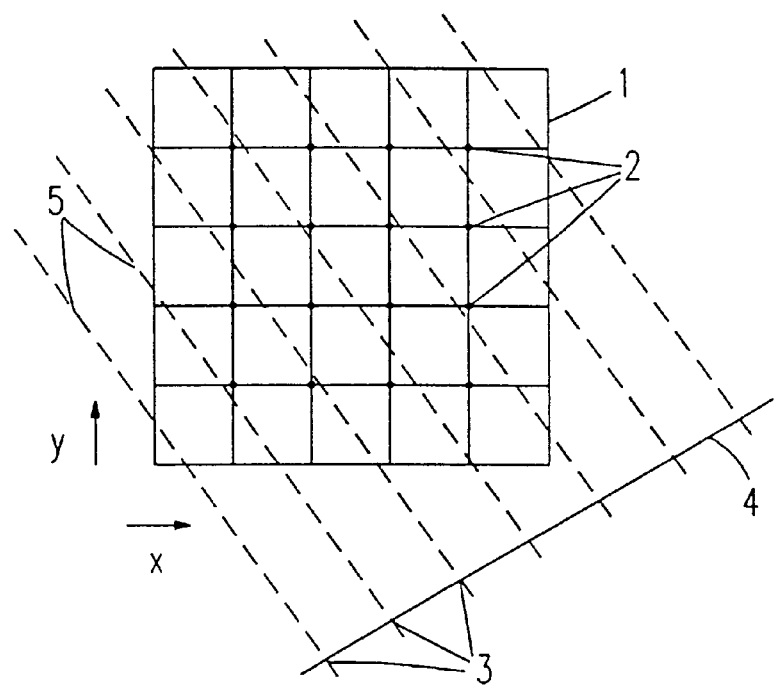
FIG. 1 shows input function data in the space domain.

FIG. 1 shows a Cartesian grid 1, at the grid points 2 of which there are situated input function data $I_c(r)$, for example 2D object function data of an X-ray image. Hereinafter, the index "c" is intended to indicate that data on a Cartesian grid is concerned. Parallel beam projections are to be formed from the input function data $I_c(r)$, i.e. the intensities are to be projected onto a straight line 4 along parallel lines 5. The projection values 3 along such a projection line 4 form a projection.

Figure 2:
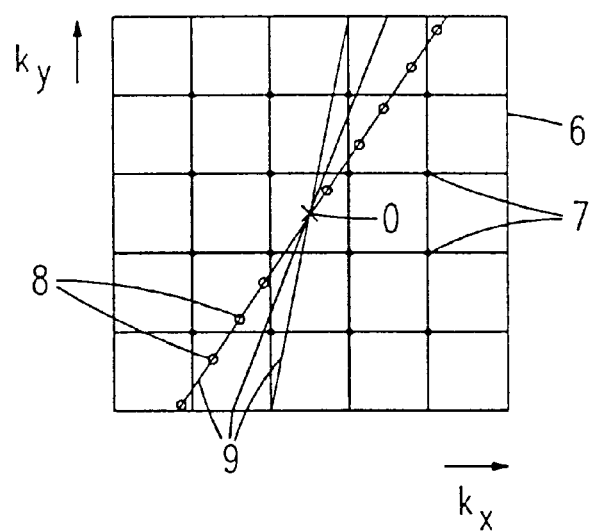
FIG. 2 shows output function data in the frequency domain.

As appears from FIG. 1, the parallel rays 5 generally do not strike the grid points 2 where input function data $I_c(r)$ is present. In order to determine function data present on the parallel rays 5, therefore, an interpolation should be performed between input function data $I_c(r)$ that are available. Fourier transformation in the frequency domain would again move the input function data to grid points 7 of a Cartesian grid (see FIG. 2). In order to form a projection which corresponds to a radial line 9 passing through the origin 0 in the frequency domain (k-space), therefore, an interpolation of the data present at the grid points 7 should again be performed so as to obtain data at sampling points 8 along a radial line 9.

Figure 3:
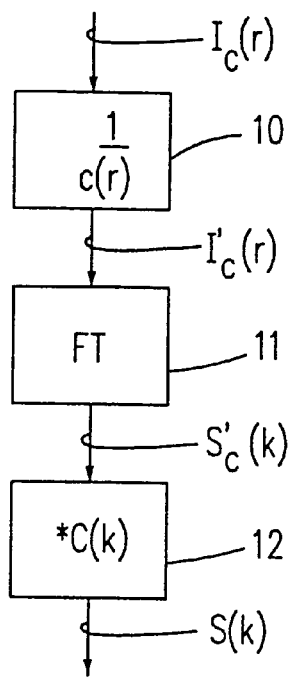
FIG. 3 shows a flow chart illustrating the method according to the invention.

FIG. 3 shows the flow chart of the method according to the invention for the determination of projection data S(k) in the frequency domain from object function data $I_c(r)$ in the space domain. During a first step 10, the object function data $I_c(r)$ is divided by the Fourier transform c(r) of a convolution kernel C(k), yielding the modified object function data $I_c'(r)$. In the next step 11 the Fourier transform $S_c'(k)$ thereof is determined. This transform is subsequently convoluted with the convolution kernel C(k) at the grid points of the selected grid during the step 12, yielding the projection data S(k) in the frequency domain; this data is no longer situated on a Cartesian grid but on the selected grid. This data can be converted into projection data in the space domain by inverse Fourier transformation.

The above steps can be mathematically described as follows:

$$I_c'(r)=I_c(r)/c(r) \quad (a)$$

$$S_c'(k)=FT\{I_c'(r)\}=S_c(k)*1/C(k) \quad (b)$$

$$S(k)=S_c'(k)*C(k)=(S_c(k)*1/C(k))*C(k) \quad (c)$$

The method can generally be used for the determination of (n−1)-dimensional projections from n-dimensional object function data; for this purpose a respective n-dimensional Fourier transformation must be performed during the step 11. The step 12 is often referred to as "resampling" or "gridding" utilizing a "convolution interpolation".

Figure 4:
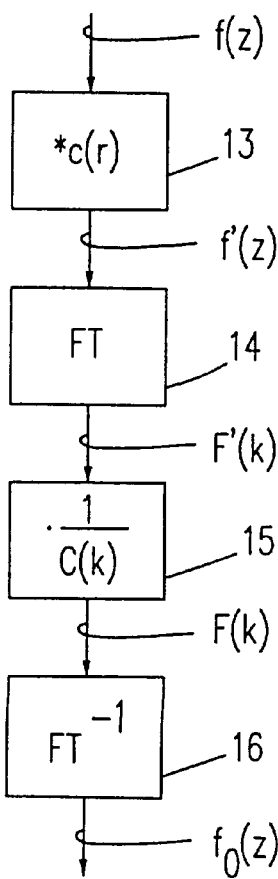
FIG. 4 shows an alternative flow chart of the method according to the invention.
Figure 5:
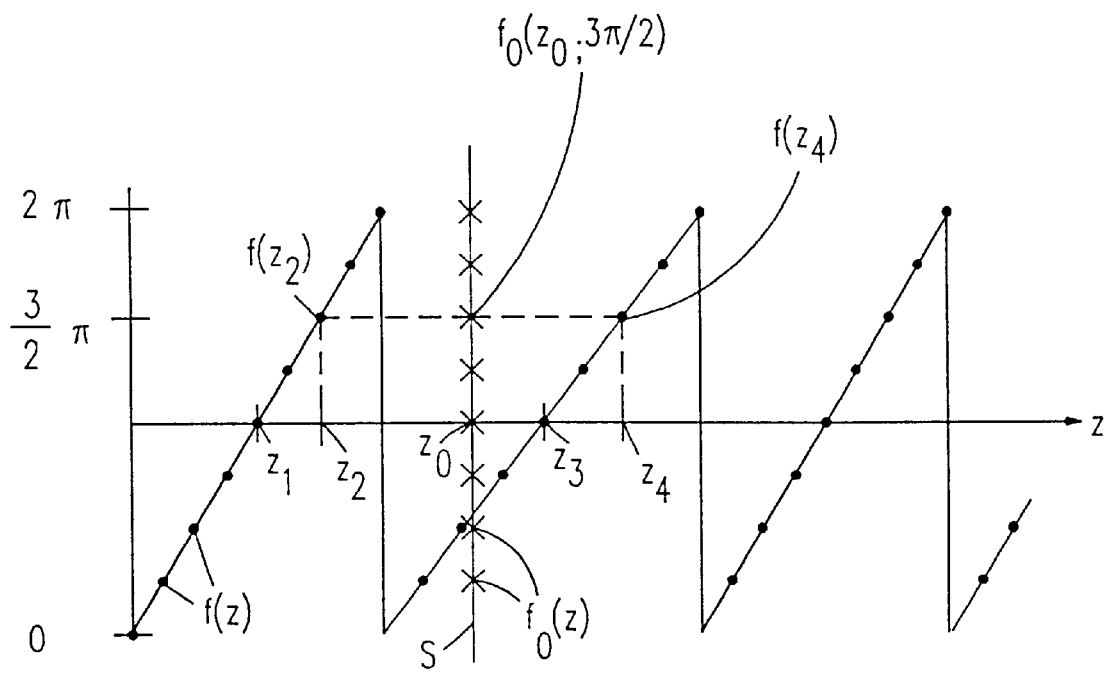
FIG. 5 shows projection data for spiral computer tomography.

FIG. 4 shows an alternative flow chart of the method according to the invention. The use of this flow chart for spiral computer tomography will be described with reference to FIG. 5. According to this method, the patient is continuously moved in the z direction through the measuring field during the X-ray exposure, producing a series of spiral volume data (projection data) f(z) for different angular positions of the X-ray tube. In order to form a slice image in a desired position $z_0$, the necessary projection values $f_0(z)$ along the slice S are determined by interpolation, for example from the two neighbouring projection values which belong to the same angular position. For example, the projection value $f_0(z_0;3/2\pi)$ is determined from the projection values $f(z_2)$ and $f(z_4)$ by interpolation.

However, the method according to the invention does not require such interpolation. During a first step 13, the projection data f(z) is convoluted with the Fourier transform c(r) of a convolution kernel. The modified projection data f'(z) obtained therefrom is subsequently subjected to a Fourier transformation (step 14). The Fourier transform F'(k) is subsequently divided (step 15) by the convolution kernel C(k), and the desired projection data along the slice S is obtained by way of the subsequent inverse Fourier transformation (step 16). The advantage of the method according to the invention resides in the fact that no blurring effects occur in the images, as opposed to the known method in which such effects are introduced by the necessary interpolations.

Figure 6:
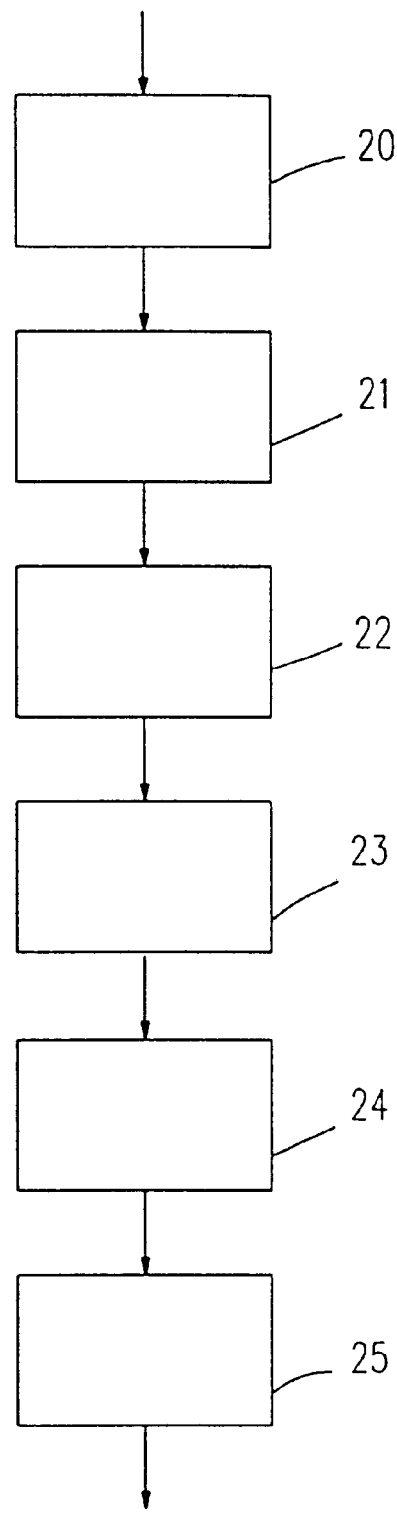
FIG. 6 illustrates a method of determining a conical beam projection for which the method according to the invention is used.

FIG. 6 shows a flow chart for determining 2D conical beam or fan-shaped beam projections from 3D object function data. First (step 20) a 3D Fourier transformation is applied to the 3D object function data. Subsequently (step 21), a 3D resampling step (corresponding to step 12 in FIG. 3) is carried out, data then being determined on radial lines extending through the origin of the 3D frequency domain. Each line is subsequently multiplied (step 22) by a one-dimensional ramp filter and the radon transform along the filtered lines is obtained by one-dimensional Fourier transformation of these lines. A 2D resampling step is carried out during the step 23, so that the data is mapped on a polar 2D grid on a spherical shell. In step 24 this data is subsequently converted into weighted conical beam projections essentially by one-dimensional Fourier transformation along the radial lines, followed by filtering along these lines and inverse Fourier transformation on a Cartesian grid. The desired conical beam projection is subsequently obtained in the step 25 by projection of the data from the virtual plane onto the real plane (for example, the detector plane in the case of X-ray imaging). The method according to the invention can be used for all of said resampling steps.

Figure 7:
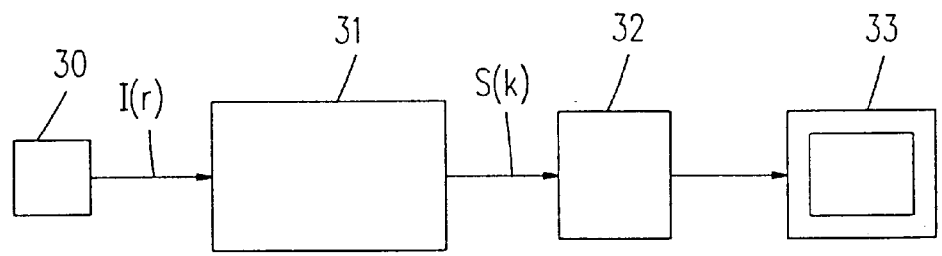
FIG. 7 shows a device in which the method according to the invention can be carried out.

FIG. 7 shows symbolically a device in which the method according to the invention can be carried out. This device may be, for example a CT device, an X-ray apparatus or a magnetic resonance device. The input function data $I_c(r)$, for example intensity values in the case of X-ray imaging, are acquired by means of the data acquisition unit 30, for example a detector device. In order to form output function data S(k), for example projection data in the function space, this data is processed by a processing unit 31 which carries out the described method in conformity with the desired application. The image calculation unit 32 determines image data therefrom for the formation of images, for example projection images for display on a monitor 33.

What is claimed is:

1. A medical image data processing method for determining output function data (S(k)), situated at grid points of a selected grid, from input function data ($I_c(r)$), situated at grid points of a cartesian grid, the method comprising:
    determination of modified input function data ($I_c'(r)$) by division of the input function data ($I_c(r)$) by the Fourier transform (c(r)) of a convolution kernel (C(k)),
    determination of the Fourier transform ($S_c'(k)$) of the modified input function data ($I_c'(r)$), and
    determination of the output function data (S(k)) by convolution of the Fourier transform ($S_c'(k)$) of the modified input function data with the convolution kernel (C(k)), wherein the convolution kernel (C(k)) is a weighting function for weighting the grid points of the cartesian grid in conformity with their distance from grid points of the selected grid.

2. A method as claimed in claim 1 wherein the input function data ($I_c(r)$) is object function data in the space domain and the output function data (S(k)) is projection data on a polar grid in the frequency domain.

3. A method as claimed in claim 1 wherein the steps of the method are executed in a reverse order.

4. A method as claimed in claim 1 wherein the method is applied to rotating the image of an object, the object function data of the rotated image then being determined from the output function data (S(k)) by Fourier transformation.

5. A method as claimed in claim 1 wherein the method is applied to deformation, deformation-elimination or for the enlargement/reduction of an image or image section, the input function data then being formed from image data in the space domain by Fourier transformation.

6. A method as claimed in claim 1 wherein the method is applied to determination of interpolation data ($f_0(z)$) from spiral volume data during spiral computer tomography.

7. A method as claimed in claim 1 wherein the convolution kernel ($C(k)$) is a Kaiser-Bessel function or a Gaussian function.

8. A method as claimed in claim 1 wherein the output function data ($S(k)$) is projection data of a parallel beam projection, conical beam projection or fan-shaped beam projection.

9. The method of claim 8 further comprising generating the parallel beam projection, the conical beam projection, or the fan-shaped beam projection by means of x-ray imaging.

10. A device comprising:

means for acquisition of input function data ($I_c(r)$), a data processing unit for determining output function data ($S(k)$) from the input function data ($I_c(r)$) by means of the method claimed in claim 1, and means for processing of the output function data.

11. The device of claim 10 wherein the means for acquisition further comprises an x-ray device means, a computer tomography device means, or a magnetic resonance device means.

12. The device of claim 10 wherein the means for processing further comprises forming images.

* * * * *